(12) United States Patent
Webb

(10) Patent No.: US 6,552,673 B2
(45) Date of Patent: Apr. 22, 2003

(54) EFFICIENT TABLE ACCESS FOR REVERSIBLE VARIABLE LENGTH CODE DECODING USING A HASH FUNCTION

(75) Inventor: Jennifer H. Webb, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 220 days.

(21) Appl. No.: 09/788,076

(22) Filed: Feb. 16, 2001

(65) Prior Publication Data

US 2002/0031185 A1 Mar. 14, 2002

Related U.S. Application Data

(60) Provisional application No. 60/184,854, filed on Feb. 25, 2000.

(51) Int. Cl.[7] .............................................. H03M 7/30
(52) U.S. Cl. ........................................... 341/67; 341/65
(58) Field of Search ..................................... 341/65, 67

(56) References Cited

U.S. PATENT DOCUMENTS 4,899,149 A * 2/1990 Kahan ........................... 341/67
5,821,887 A * 10/1998 Zhu ............................... 341/67

OTHER PUBLICATIONS

Webb, Efficient table Access for Reversible Variable–Length Decoding, IEEE Transactions on Circuits and Systems for Video Technology, vol. 11, No. 8, Aug. 2001.*
Bauer et al., Iterative Source/Channel–Decoding Using Reversible Variable Length Codes, Proceedings of IEEE 2000 Data Compression Conference, DCC 2000; Snowbird Utah Mar. 28–30, 2000, pp. 93–102.*
Girod B., Bidirectionally Decodable Streams of Prefix Code–Words; IEEE Communications Letters, vol. 3, No. 8, Aug. 1999, pp. 245–247.*
Takishima, Y et al.; Reversible Variable Length Codes; IEEE Transaction of Communications; Feb./Mar./Apr. 1995; vol. 43, No.2/3/4; pp. 158–162.*

* cited by examiner

*Primary Examiner*—Howard L. Williams
(74) *Attorney, Agent, or Firm*—Carlton H. Hoel; W. James Brady; Frederick J. Telecky, Jr.

(57) ABSTRACT

An efficient decoding of reversible variable length codes of the type implemented for H.263++ and MPEG-4 DCT coefficients using lookup tables. Simple-profile MPEG-4 also has the option of using reversible variable length codewords (RVLC) that can be decoded in either the forward or backward direction, for error recovery. Because of the special structure of RVLC codewords, the decoding techniques for regular VLC are less efficient with RVLC. A new method for RVLC decoding is described.

3 Claims, 4 Drawing Sheets

FIG. 1
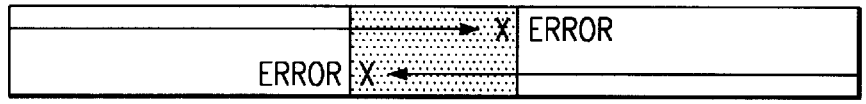
FIG. 2
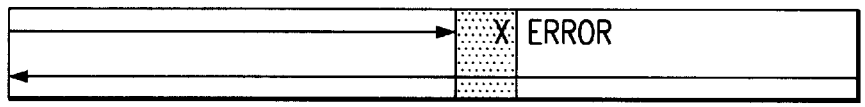
FIG. 3
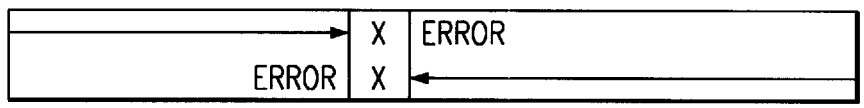
FIG. 4
| ESCAPE 00001 5 BITS | LAST X 1 BIT | RUN XXXXXX 6 BITS | MARKER 1 1 BIT | LEVEL XX··XX 11 BITS | MARKER 1 1 BIT | ESCAPE 0000s 5 BITS |
FIG. 5

| RESYNCH MARKER | MB NUMBER | QP | MOTION DATA | MOTION RESYNCH WORD | DCT DATA | RESYNCH MARKER |

| COD$_1$ | MCBPC$_1$ | MV$_1$ | COD$_2$ | MCBPC$_2$ | MV$_2$ | COD$_3$ | ... | MV$_n$ |

| CBPY$_1$ | DQUANT$_1$ | CBPY$_2$ | DQUANT$_2$ | ... | DQUANT$_n$ | DCT$_1$ | ... | DCT$_n$ |

EFFICIENT TABLE ACCESS FOR REVERSIBLE VARIABLE LENGTH CODE DECODING USING A HASH FUNCTION

CROSS-REFERENCE TO RELATED APPLICATIONS

This application claims priority from provisional application Ser. No. 60/184,854, filed Feb. 25, 2000. The following copending U.S. patent applications Ser. No. 09/631,261, filed Aug. 2, 2000, disclose related subject matter.

BACKGROUND

The present application relates to information encoding for transmission over noisy channels and/or storage, and more particularly to error resilient coding.

The current rapid expansion of digital communication (speech, video, data) relies on increasingly economical digital signal processing. For example, video communication has general functionality as illustrated in FIG. 8a, and increasingly includes a link through the air interface (FIG. 8b) which can introduce noise and bit errors to the digital signal. Attempts to mitigate bit errors include the use of reversible codes as described in the following.

Commonly used video compression methods (e.g., MPEG) have block-based motion compensation to remove temporal redundancy (code only (macro)block motion vectors plus the corresponding quantized DCT residuals (texture) as in FIG. 8c) and use variable length coding (VLC) to increase coding efficiency. However, variable length coding often is highly susceptible to transmission channel errors, and a decoder easily loses synchronization with the encoder when uncorrectable errors arise. Further, the predictive nature of motion compensation makes matters much worse because the uncorrectable errors in one video frame quickly propagate across the entire video sequence and rapidly degrade the decoded video quality.

The typical approach to such uncorrectable errors includes the steps of: error detection (e.g., out-of-range motion vectors, invalid VLC table entry, or invalid number of residuals in a block), resynchronization of the decoder with the encoder, and error concealment by repetition of previously transmitted correct data in place of the uncorrectable data. For example, video compressed using MPEG1–2 has a resynchronization marker (start code) at the start of each slice of macroblocks (MBs) of a frame, and an uncorrectable error results in all of the data between correctly decoded resynchronization markers being discarded. This implies degradation in quality of the video stream.

VLC tables prove to be particularly sensitive to bit errors because bit errors can make one codeword be incorrectly interpreted to be another codeword of a different length, and the error is not detected. This makes the decoder lose synchronization with the encoder. Although the error may finally be detected due to an invalid VLC table entry, usually the location in the bitstream where the error is detected is not the same as the location where the error occurred. Hence, when the decoder detects an error, it has to seek the next resynchronization marker and discard all the data between this and the previous resynchronization marker. Thus, even a single bit error can sometimes result in a loss of a significant amount of data, and this is a problem of the known coding schemes.

Enhanced error concealment properties for motion compensated compression, such as MPEG, can be achieved by using data partitioning. Consider a "video packet" to consist of the data between two consecutive resynchronization markers. In a data partitioning approach, the motion data and the texture (DCT) data within each of the video packets are separately encoded in the bitstream. Another resynchronization word (Motion Resync. Word) is imbedded between the motion data and the DCT data to signal the end of the motion data and the beginning of the DCT data. This data partitioning allows the decoder to use the motion data even if the DCT data is corrupted by undetectable errors. This provides advantages including partial recovery over uncorrectable error in a packet of compressed video data with little additional overhead. The error concealment that is made possible by the use of motion compensation by applying decoded motion vectors results in a much better decoded video quality. And this extends to video packets for intra-coded frames in that the DCT dc coefficients can be separated from the other, less important texture data (DCT ac coefficients) by a DC resynchronization word.

When using data partitioning the data within the video packet is organized to look as shown in FIGS. 6a–c: FIG. 6a shows the fields between two resynchronization markers and FIGS. 6b–c illustrate the motion data field and the texture data field in more detail by an example. In particular, the first field ("Resynch Marker") is a resynchronization marker, the second field ("MB No.") is the the number in the frame of the first macroblock (16×16 block of pixels) in the video packet, the third field ("QP") is the default quantization parameter used to quantize the texture data (DCT coefficients) in the video packet, the fourth field ("Motion Data") is the motion data, the fifth field ("Motion Resynch Word") is the resynchronization marker between the motion data and the texture data, the sixth field ("DCT Data") is the texture data, and the last field ("Resynch Marker") is the ending resynchronization marker.

FIG. 6b shows the motion data field consisting of a COD field, an MCBPC field, and an MV field for each of the macroblocks in the packet. The COD field indicates whether the macroblock is coded or skipped (COD=0 macroblock is coded, COD=1 macroblock is skipped). The MCBPC field indicates (1) the mode of the macroblock and (2) which of the chrominance blocks in the macroblock are coded and which are skipped: the mode indicates whether the current macroblock is coded INTRA (no motion compensation), INTER (motion compensated with one 16×16 motion vector), or INTER4V (motion compensated with four 8×8 motion vectors). Of course, if COD indicates the macroblock is not coded, then the MCBPC field is not present. The MV field is the actual motion vector data; either one vector or four vectors. Again, if COD indicates that the macroblock is not coded, then the MV field is not present. FIG. 6c shows the texture (DCT Data) field as consisting of a CBPY field and a DQUANT field for each of the macroblocks followed by the DCT data for each of the macroblocks. The CBPY field indicates which of the luminance blocks of the macroblock are coded and which are skipped. The DQUANT field indicates the differential increment to the default quantizer value (QP) to compute the quantization value for the macroblock. The DCT fields are run-length-encoded quantized DCT coefficient values of the macroblock.

MPEG-4 has three kinds of VLCs to encode the DCT coefficients: Table B-16 for encoding INTRA macroblocks, Table B-17 for coding INTER macroblocks, and Table B-23 which is used for coding macroblocks if reversible variable length codes (RVLC) are used. In contrast, H.263 uses only one table for encoding both the INTER and INTRA MBs: Table 13/H263. Table 13/H263 is identical to Table B-17 of MPEG-4.

Decoding normal VLCs (Table B-16/B-17 of MPEG-4 and Table 13/H263 of H.263) is done using identical techniques, thus consider the decoding of VLCs from Table 13/H263 of H.263. The length of VLC codewords in Table 13/H263 varies from 3 to 13 bits. The last bit is always a sign bit and is not used in variable length decoding, so the number of decodable bits varies up to 12. Variable length decoding is typically carried out in most of the standard decoders by using two different tables: DCT3DtabXval which contains the entries of Table 13/H263 and DCT3DtabXlen which contains the length of the corresponding codewords. Since the length of the VLC codeword is not known in advance, the fastest way to decode a VLC would be by using $2^{12}$ (4096) entries in DCT3DtabXval. If $2^{12}$ elements are used in DCT3DtabXval, then 12 bits from the bitstream can be read and be directly used to index into DCT3DtabXval to obtain the decoded values. The same 12 bits are indexed into DCT3DtabXlen to obtain the length of the codeword. The initial bits in the bitstream corresponding to the length of the codeword are then discarded and the process is repeated on the remaining bits plus the next bits in the bitstream up to 12 bits. Note that there are only 102 entries in Table 13/H263. Hence the DCT3DtabXval table and the DCT3DtabXlen table in sequential memory with index addresses would contain many duplicate entries. To conserve on memory, one may split DCT3DtabXval/DCT3DtabXlen based on the number of leading zeros present in the 12 bits, but this increases index complexity.

Reversible variable length codes (RVLC) are designed such that they can be decoded in either the forward or backward direction; see FIGS. 1–4 illustrating error detection possibilities. These codes are useful when the data may be corrupted by errors. MPEG-4 video includes the option to use RVLC for the DCT data. The RVLC for MPEG-4 is formed by concatenating a variable-length code (VLC) with a fixed-length code (FLC) where the FLC part has 2 bits, including the sign bit. The VLC part either starts and ends with a 1 with all, if any, zeroes in between; or starts and ends with a 0 with exactly one 0 in between (the rest of the bits, if any, equal 1). That is, the VLC part is either 100 . . . 001 (with possibly no 0s) or 01 . . . 101 . . . 10 with position of the interior 0 anywhere among the 1 s. The longest valid RVLC codeword is 15 bits plus a sign bit, so the VLC part can be as long as 14 bits. Contrarily, the VLC part can be as short as 2 bits (11 if starting with a 1) or 3 bits (000 if starting with a 0). Because of the way the RVLC is designed, the codebook is very sparse. Also, not all RVLC codewords with this structure are used; see the following table which shows codewords 01 1111 1101 1110 through 01 1111 1111 1100 are not used among the 14-bit VLC part. Codewords are defined for the 169 most commonly occurring events (combinations of last, level, and run), and an escape codeword for all other cases. The RVLC structure does not lend itself to the type of table lookup strategy that is used for regular VLCs. With the typical VLC lookup strategy, 15 bits (without the sign bit) would be read from the bitstream. A single table would require $2^{15}$=32K (0x0000 to 0x7FFF in hexadecimal) entries, or the table could be partitioned according to the number of leading zeroes. However, for the MPEG-4 RVLC, this doesn't help much: there are 24 codewords beginning with a 1, 22 codewords with two leading 0's, only two codewords with three or more leading 0's, and all other 122 codewords have exactly one leading 0. The lookup table for codewords with exactly one leading 0 would have to cover indices 010 00xx xxxx xxxx through 011 1111 0111 1101, requiring 0x3F7D−0x2000=0x1F7D (=8061 decimal) entries for the 122 codewords that begin with a single leading 0. Thus, the normal VLC decoding approach is very inefficient for RVLC decoding. Because RVLC codewords require so much memory to use the typical VLC decoding approach, the known MoMuSys software uses a brute force approach for decoding RVLC of MPEG-4 Table B-23 as follows. A test is made, comparing with each possible codeword (not counting the sign bit). When the match is found, the index into a densely-packed lookup table is hard-coded. The MoMuSys RVLC decode is implemented using one gigantic case statement. For efficiency, it is best to test for the shorter, more common codewords first. However, the worst-case cycles can be quite high, if all 169 cases are tested before finding a match. And this is not sufficiently efficient for effective use of RVLC decoding with MPEG4.

SUMMARY OF THE INVENTION

The present invention uses a codeword hashing index to access reversible VLC (RVLC) tables such as in MPEG and H.263.

This has the advantage of better performance and smaller memory requirements for RVLC decoding.

BRIEF DESCRIPTION OF THE DRAWINGS

The drawings are heuristic for clarity.

FIGS. 1–4 shows error detection with reversible coding.

FIG. 5 illustrates the fixed length code for events outside of the preferred embodiment code tables.

DESCRIPTION OF THE PREFERRED EMBODIMENTS

Overview

Figures 6A, 6B, 6C, 7:
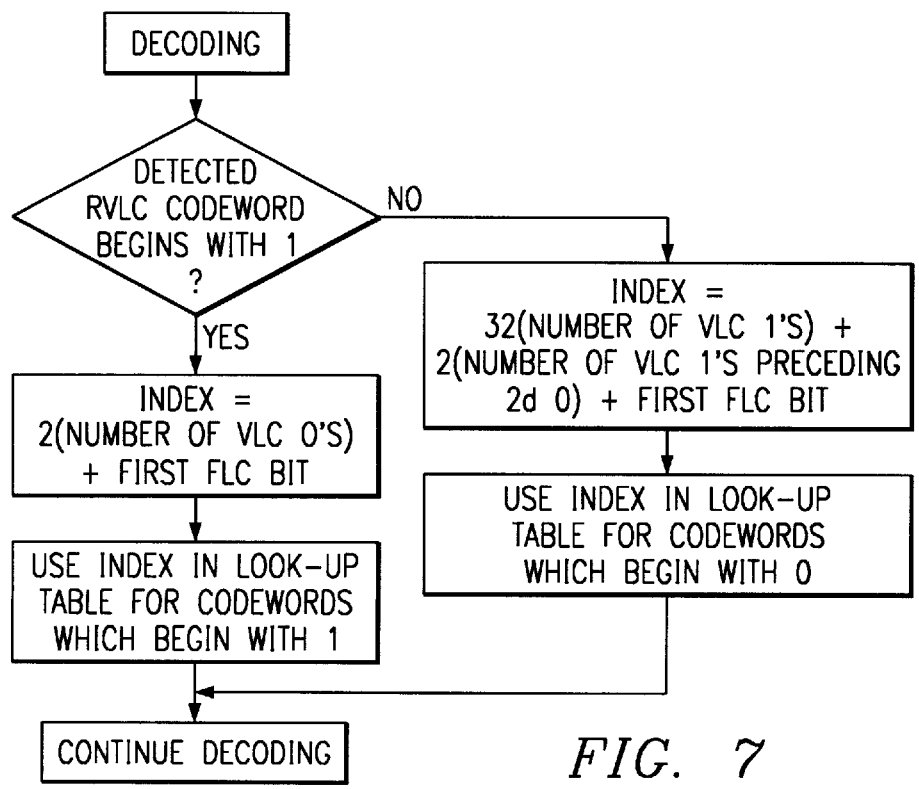
FIGS. 6a–6c indicate video bitstream structure.
FIG. 7 is a flow diagram.
Figure 8A:
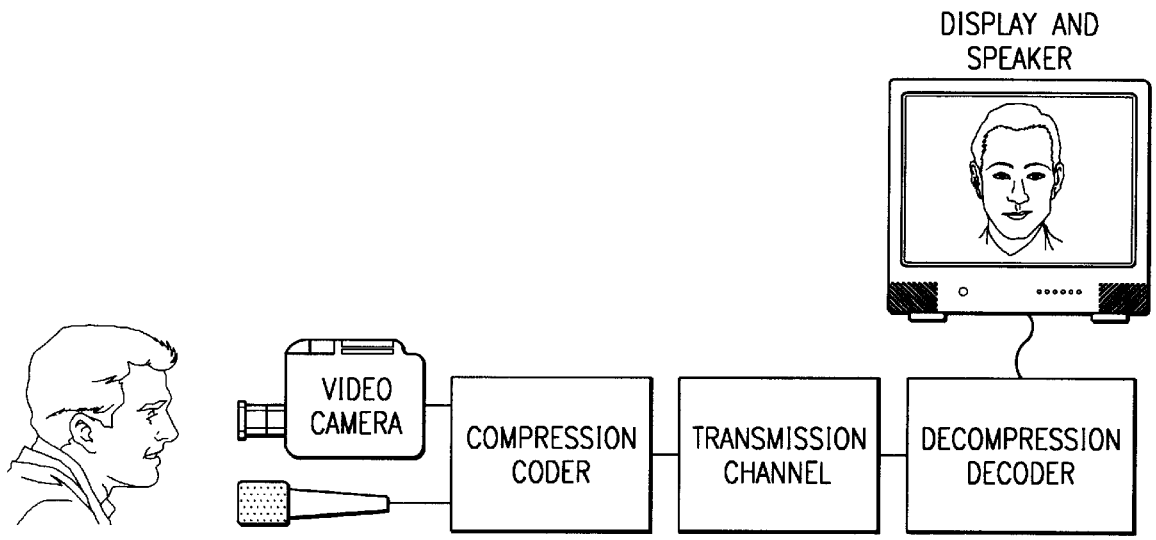
FIGS. 8a–8c illustrate systems.
Figure 8C:
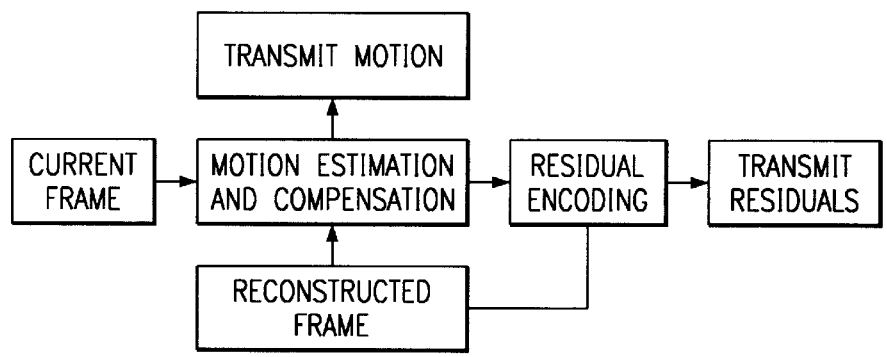

The preferred embodiments store/decode the reversible variable length codes of MPEG-4 Table B-23 (used for DCT coefficients) with a hash-type function of the codeword providing an index (address) for compact memory storage and efficient decoding. Thus preferred embodiment systems such as teleconferencing or Internet video reception would have a receiver with a memory storing the Table B-23 in a preferred embodiment indexed manner and available for use for decoding received video.

Note that these video systems and decoding methods may be implemented on special integrated circuits or on programmable microprocessors or digital signal processors such as the TMS320C5000 or C6000 families from Texas Instruments.

First Preferred Embodiments

Preliminarily consider modification of the MoMuSys code for RVLC decoding to reduce the worst-case computation. Because of the RVLC structure, it is possible to find the end of the codeword during parsing. The codeword can be extracted without any trailing "don't care" bits before it is decoded. The worst-case computation can be reduced by testing for ranges of code values before testing for matches. For instance, the first preferred embodiments modify the MoMuSys code to test according to the position of the MSB (after finding the end of the codeword and storing it in a separate memory location), i.e., if (code<0x8) { } else if (code<0x10) { }

```
else if (code<0x20) { }
else if (code<0x40) { }
...
else if (code<0x2000) { }
else { }
```

This approach breaks the codewords into 12 classes of similar size. But even after the codewords are broken into these 12 classes, a table lookup is not memory-efficient. For example, the 24 codewords between 0x1000 and 0x2000 range from 0x1002 to 0x1FF9, which would require a table of size 0x1FF9−0x1002=4087 (decimal) entries. Thus, the code is written to test for matches against every possible codeword, but some matches are skipped by dividing the codewords into classes. The worst case requires 35 "if" tests (compared to 169), or one more, for an invalid codeword. Note, similar techniques could be applied for backward decoding of RVLC data.

Note that the events coded for an 8×8 block of DCT coefficients are a combination of three fields: a 1-bit LAST field which indicates whether the coefficient is the last nonzero coefficient in the block, a 6-bit RUN which indicates the number of successive zeros preceding the coded coefficient, and an 11-bit LEVEL which is the nonzero value of the coded coefficient. As illustrated in FIG. 5 a 5-bit ESCAPE code (0000x) begins and ends the event code with the last bit of the end ESCAPE code reflecting the sign of the nonzero coefficient. Table B-23 provides RVLC for the 169 most common events plus the ESCAPE for less common events.

The sparse nature of RVLC codewords makes it inefficient to use table lookups indexed by the codeword itself, but the structure of the codewords is used by the preferred embodiments to define a sort of hashing function to access a table that can be more densely packed. In particular, the preferred embodiments define an index (for a codeword table) based on the codeword itself as follows.

(1) For codewords starting with 1 (VLC part of form 100 ... 001), form an index into a separate table of such codewords:

Index=2*(number of 0's in VLC part)+first bit (non-sign bit) of FLC part.

Thus this index runs from 0 to 23. The index can also be expressed as a 5-bit concatenation of 4 bits to indicate the up-to-eleven 0's in the VLC part followed by the 1 bit equal to the non-sign bit of the FLC part. And the indexing running from 0 to 23 implies a 24-word block of memory can contain each of the inter and intra tables.

(2) For codewords starting with 0 (VLC part of form 01 ... 101 ... 10), similarly form an index into a table for such codewords:

Index=32*(number of 1's in VLC part)+2*(number of 1's preceding the 0 in VLC part)+first bit (non-sign bit) of FLC.

This index runs from 0 to 365 and can be expressed as a 9-bit concatenation of 4 bits indicating the up to eleven interior 1's of the VLC part followed by 4 bits indicating the up to ten 1's preceding the interior 0 in the VLC part and completed by the 1 bit equal to the non-sign bit of the FLC part. The index running from 0 to 365 implies a 366-word block of memory can contain each of the inter and intra tables.

The computation of the appropriate index can be done fairly efficiently as a byproduct of the parsing, especially on devices (such as DSPs) which offer a single-cycle EXP-like instruction to count the number of leading 0's or 1's (after stripping off the starting bit). The following table shows the MPEG-4 RVLC table B-23, with the corresponding preferred embodiment "hash" indices shown beside the codeword for the 0-starting and 1-starting codewords.

| B-23 | intra | | | inter | | | | 1-start | 0-start | |
|---|---|---|---|---|---|---|---|---|---|---|
| index | LAST | RUN | LEVEL | LAST | RUN | LEVEL | BITS | hash Index | hash Index | RVLC_CODE |
| 0 | 0 | 0 | 1 | 0 | 0 | 1 | 4 | 0 | | 110s |
| 1 | 0 | 0 | 2 | 0 | 1 | 1 | 4 | 1 | | 111s |
| 2 | 0 | 1 | 1 | 0 | 0 | 2 | 5 | | 1 | 0001s |
| 3 | 0 | 0 | 3 | 0 | 2 | 1 | 5 | 2 | | 1010s |
| 4 | 1 | 0 | 1 | 1 | 0 | 1 | 5 | 3 | | 1011s |
| 5 | 0 | 2 | 1 | 0 | 0 | 3 | 6 | | 32 | 00100s |
| 6 | 0 | 3 | 1 | 0 | 3 | 1 | 6 | | 33 | 00101s |
| 7 | 0 | 1 | 2 | 0 | 4 | 1 | 6 | | 34 | 01000s |
| 8 | 0 | 0 | 4 | 0 | 5 | 1 | 6 | | 35 | 01001s |
| 9 | 1 | 1 | 1 | 1 | 1 | 1 | 6 | 4 | | 10010s |
| 10 | 1 | 2 | 1 | 1 | 2 | 1 | 6 | 5 | | 10011s |
| 11 | 0 | 4 | 1 | 0 | 1 | 2 | 7 | | 64 | 001100s |
| 12 | 0 | 5 | 1 | 0 | 6 | 1 | 7 | | 65 | 001101s |
| 13 | 0 | 0 | 5 | 0 | 7 | 1 | 7 | | 66 | 010100s |
| 14 | 0 | 0 | 6 | 0 | 8 | 1 | 7 | | 67 | 010101s |
| 15 | 1 | 3 | 1 | 1 | 3 | 1 | 7 | | 68 | 011000s |
| 16 | 1 | 4 | 1 | 1 | 4 | 1 | 7 | | 69 | 11001s |
| 17 | 1 | 5 | 1 | 1 | 5 | 1 | 7 | 6 | | 100010s |
| 18 | 1 | 6 | 1 | 1 | 6 | 1 | 7 | 7 | | 100011s |
| 19 | 0 | 6 | 1 | 0 | 0 | 4 | 8 | | 96 | 0011100s |
| 20 | 0 | 7 | 1 | 0 | 2 | 2 | 8 | | 97 | 0011101s |
| 21 | 0 | 2 | 2 | 0 | 9 | 1 | 8 | | 98 | 0101100s |
| 22 | 0 | 1 | 3 | 0 | 10 | 1 | 8 | | 99 | 0101101s |
| 23 | 0 | 0 | 7 | 0 | 11 | 1 | 8 | | 100 | 0110100s |
| 24 | 1 | 7 | 1 | 1 | 7 | 1 | 8 | | 101 | 0110101s |
| 25 | 1 | 8 | 1 | 1 | 8 | 1 | 8 | | 102 | 0111000s |
| 26 | 1 | 9 | 1 | 1 | 9 | 1 | 8 | | 103 | 0111001s |
| 27 | 1 | 10 | 1 | 1 | 10 | 1 | 8 | 8 | | 1000010s |
| 28 | 1 | 11 | 1 | 1 | 11 | 1 | 8 | 9 | | 1000011s |

-continued

| B-23 | intra | | | inter | | | | 1-start | 0-start | |
|---|---|---|---|---|---|---|---|---|---|---|
| index | LAST | RUN | LEVEL | LAST | RUN | LEVEL | BITS | hash Index | hash Index | RVLC_CODE |
| 29 | 0 | 8 | 1 | 0 | 0 | 5 | 9 | | 128 | 00111100s |
| 30 | 0 | 9 | 1 | 0 | 0 | 6 | 9 | | 129 | 00111101s |
| 31 | 0 | 3 | 2 | 0 | 1 | 3 | 9 | | 130 | 01011100s |
| 32 | 0 | 4 | 2 | 0 | 3 | 2 | 9 | | 131 | 01011101s |
| 33 | 0 | 1 | 4 | 0 | 4 | 2 | 9 | | 132 | 1101100s |
| 34 | 0 | 1 | 5 | 0 | 12 | 1 | 9 | | 133 | 01101101s |
| 35 | 0 | 0 | 8 | 0 | 13 | 1 | 9 | | 134 | 01110100s |
| 36 | 0 | 0 | 9 | 0 | 14 | 1 | 9 | | 135 | 01110101s |
| 37 | 1 | 0 | 2 | 1 | 0 | 2 | 9 | | 136 | 01111000s |
| 38 | 1 | 12 | 1 | 1 | 12 | 1 | 9 | | 137 | 01111001s |
| 39 | 1 | 13 | 1 | 1 | 13 | 1 | 9 | 10 | | 10000010s |
| 40 | 1 | 14 | 1 | 14 | 1 | 9 | 11 | | | 10000011s |
| 41 | 0 | 10 | 1 | 0 | 0 | 7 | 10 | | 160 | 001111100s |
| 42 | 0 | 5 | 2 | 0 | 1 | 4 | 10 | | 161 | 001111101s |
| 43 | 0 | 2 | 3 | 0 | 2 | 3 | 10 | | 162 | 010111100s |
| 44 | 0 | 3 | 3 | 0 | 5 | 2 | 10 | | 163 | 010111101s |
| 45 | 0 | 1 | 6 | 0 | 15 | 1 | 10 | | 164 | 011011100s |
| 46 | 0 | 0 | 10 | 0 | 16 | 1 | 10 | | 165 | 011011101s |
| 47 | 0 | 0 | 11 | 0 | 17 | 1 | 10 | | 166 | 011101100s |
| 48 | 1 | 1 | 2 | 1 | 1 | 2 | 10 | | 167 | 011101101s |
| 49 | 1 | 15 | 1 | 1 | 15 | 1 | 10 | | 168 | 011110100s |
| 50 | 1 | 16 | 1 | 1 | 16 | 1 | 10 | | 169 | 011110101s |
| 51 | 1 | 17 | 1 | 1 | 17 | 1 | 10 | | 170 | 011111000s |
| 52 | 1 | 18 | 1 | 1 | 18 | 1 | 10 | | 171 | 011111001s |
| 53 | 1 | 19 | 1 | 1 | 19 | 1 | 10 | 12 | | 100000010s |
| 54 | 1 | 20 | 1 | 1 | 20 | 1 | 10 | 13 | | 100000011s |
| 55 | 0 | 11 | 1 | 0 | 0 | 8 | 11 | | 192 | 0011111100s |
| 56 | 0 | 12 | 1 | 0 | 0 | 9 | 11 | | 193 | 0011111101s |
| 57 | 0 | 6 | 2 | 0 | 1 | 5 | 11 | | 194 | 0101111100s |
| 58 | 0 | 7 | 2 | 0 | 3 | 3 | 11 | | 195 | 0101111101s |
| 59 | 0 | 8 | 2 | 0 | 6 | 2 | 11 | | 196 | 0110111100s |
| 60 | 0 | 4 | 3 | 0 | 7 | 2 | 11 | | 197 | 0110111101s |
| 61 | 0 | 2 | 4 | 0 | 8 | 2 | 11 | | 198 | 0111011100s |
| 62 | 0 | 1 | 7 | 0 | 9 | 2 | 11 | | 199 | 0111011101s |
| 63 | 0 | 0 | 12 | 0 | 18 | 1 | 11 | | 200 | 0111101100s |
| 64 | 0 | 0 | 13 | 0 | 19 | 1 | 11 | | 201 | 0111101101s |
| 65 | 0 | 0 | 14 | 0 | 20 | 1 | 11 | | 202 | 0111110100s |
| 66 | 1 | 21 | 1 | 1 | 21 | 1 | 11 | | 203 | 0111110101s |
| 67 | 1 | 22 | 1 | 1 | 22 | 1 | 11 | | 204 | 0111111000s |
| 68 | 1 | 23 | 1 | 1 | 23 | 1 | 11 | | 205 | 0111111001s |
| 69 | 1 | 24 | 1 | 1 | 24 | 1 | 11 | 14 | | 1000000010s |
| 70 | 1 | 25 | 1 | 1 | 25 | 1 | 11 | 15 | | 1000000011s |
| 71 | 0 | 13 | 1 | 0 | 0 | 10 | 12 | | 224 | 00111111100s |
| 72 | 0 | 9 | 2 | 0 | 0 | 11 | 12 | | 225 | 00111111101s |
| 73 | 0 | 5 | 3 | 0 | 1 | 6 | 12 | | 226 | 01011111100s |
| 74 | 0 | 6 | 3 | 0 | 2 | 4 | 12 | | 227 | 01011111101s |
| 75 | 0 | 7 | 3 | 0 | 4 | 3 | 12 | | 228 | 01101111100s |
| 76 | 0 | 3 | 4 | 0 | 5 | 3 | 12 | | 229 | 01101111101s |
| 77 | 0 | 2 | 5 | 0 | to | 2 | 12 | | 230 | 01110111100s |
| 78 | 0 | 2 | 6 | 0 | 21 | 1 | 12 | | 231 | 01110111101s |
| 79 | 0 | 1 | 8 | 0 | 22 | 1 | 12 | | 232 | 01111011100s |
| 80 | 0 | 1 | 9 | 0 | 23 | 1 | 12 | | 233 | 01111011101s |
| 81 | 0 | 0 | 15 | 0 | 24 | 1 | 12 | | 234 | 01111101100s |
| 82 | 0 | 0 | 16 | 0 | 25 | 1 | 12 | | 235 | 01111101101s |
| 83 | 0 | 0 | 17 | 0 | 26 | 1 | 12 | | 236 | 01111110100s |
| 84 | 1 | 0 | 3 | 1 | 0 | 3 | 12 | | 237 | 01111110101s |
| 85 | 1 | 2 | 2 | 1 | 2 | 2 | 12 | | 238 | 01111111000s |
| 86 | 1 | 26 | 1 | 1 | 26 | 1 | 12 | | 239 | 01111111001s |
| 87 | 1 | 27 | 1 | 1 | 27 | 1 | 12 | 16 | | 10000000010s |
| 88 | 1 | 28 | 1 | 1 | 28 | 1 | 12 | 17 | | 10000000011s |
| 89 | 0 | 10 | 2 | 0 | 0 | 12 | 13 | | 256 | 001111111100s |
| 90 | 0 | 4 | 4 | 0 | 1 | 7 | 13 | | 257 | 0011111111010 |
| 91 | 0 | 5 | 4 | 0 | 2 | 5 | 13 | | 258 | 010111111100s |
| 92 | 0 | 6 | 4 | 0 | 3 | 4 | 13 | | 259 | 010111111101s |
| 93 | 0 | 3 | 5 | 0 | 6 | 3 | 13 | | 260 | 011011111100s |
| 94 | 0 | 4 | 5 | 0 | 7 | 3 | 13 | | 261 | 011011111101s |
| 95 | 0 | 1 | 10 | 0 | 11 | 2 | 13 | | 262 | 011101111100s |
| 96 | 0 | 0 | 18 | 0 | 27 | 1 | 13 | | 263 | 011101111101s |
| 97 | 0 | 0 | 19 | 0 | 28 | 1 | 13 | | 264 | 011110111100s |
| 98 | 0 | 0 | 22 | 0 | 29 | 1 | 13 | | 265 | 011110111101s |
| 99 | 1 | 1 | 3 | 1 | 1 | 3 | 13 | | 266 | 01U11011100s |
| 100 | 1 | 3 | 2 | 1 | 3 | 2 | 13 | | 267 | 0111110111010 |
| 101 | 1 | 4 | 2 | 1 | 4 | 2 | 13 | | 268 | 011111101100s |
| 102 | 1 | 29 | 1 | 1 | 29 | 1 | 13 | | 269 | 011111101101s |
| 103 | 1 | 30 | 1 | 1 | 30 | 1 | 13 | | 270 | 011111110100s |

-continued

| B-23 | intra | | | inter | | | | 1-start | 0-start | |
|---|---|---|---|---|---|---|---|---|---|---|
| index | LAST | RUN | LEVEL | LAST | RUN | LEVEL | BITS | hash Index | hash Index | RVLC_CODE |
| 104 | 1 | 31 | 1 |   | 31 | 1 | 13 |   | 271 | 011111110101s |
| 105 | 1 |   |   |   | 32 | 1 |   |   | 272 | 011111111000s |
| 106 | 1 | 33 | 1 | 1 | 33 | 1 | 13 |   | 273 | 011111111001s |
| 107 | 1 | 34 | 1 | 1 | 34 | 1 | 13 | 18 |   | 100000000010s |
| 108 | 1 | 35 | 1 | 1 | 35 | 1 | 13 | 19 |   | 100000000011s |
| 109 | 0 | 14 | 1 | 0 | 0 | 13 | 14 |   | 288 | 0011111111100s |
| 110 | 0 | 15 | 1 | 0 | 0 | 14 | 14 |   | 289 | 0011111111101s |
| 111 | 0 | 11 | 2 | 0 | 0 | 15 | 14 |   | 290 | 0101111111100s |
| 112 | 0 | 8 | 3 | 0 | 0 | 16 | 14 |   | 291 | 0101111111101s |
| 113 | 0 | 9 | 3 | 0 | 1 | 8 | 14 |   | 292 | 0110111111100s |
| 114 | 0 | 7 | 4 | 0 | 3 | 5 | 14 |   | 293 | 0110111111101s |
| 115 | 0 | 3 | 6 | 0 | 4 | 4 | 14 |   | 294 | 0111011111100s |
| 116 | 0 | 2 | 7 | 0 | 5 | 4 | 14 |   | 295 | 0111011111101s |
| 117 | 0 | 2 | 8 | 0 | 8 | 3 | 14 |   | 296 | 0111101111100s |
| 118 | 0 | 2 | 9 | 0 | 12 | 2 | 14 |   | 297 | 0111101111101s |
| 119 | 0 | 1 | 11 | 0 | 30 | 1 | 14 |   | 298 | 0111110111100s |
| 120 | 0 | 0 | 20 | 0 | 31 | 1 | 14 |   | 299 | 0111110111101s |
| 121 | 0 | 0 | 21 | 0 | 32 | 1 | 14 |   | 300 | 0111111011100s |
| 122 | 0 | 0 | 23 | 0 | 33 | 1 | 14 |   | 301 | 0111111011101s |
| 123 | 1 | 0 | 4 | 1 | 0 | 4 | 14 |   | 302 | 0111111101100s |
| 124 | 1 | 5 | 2 | 1 | 5 | 2 | 14 |   | 303 | 0111111101101s |
| 125 | 1 | 6 | 2 | 1 | 6 | 2 | 14 |   | 304 | 0111111110100s |
| 126 | 1 | 7 | 2 | 1 | 7 | 2 | 14 |   | 305 | 0111111110101s |
| 127 | 1 | 8 | 2 | 1 | 8 | 2 | 14 |   | 306 | 0111111111000s |
| 128 | 1 | 9 | 2 | 1 | 9 | 2 | 14 |   | 307 | 011111111,100ts |
| 129 | 1 | 36 | 1 | 1 | 36 | 1 | 14 | 20 |   | 1000000000010s |
| 130 | 1 | 37 | 1 | 1 | 37 | 1 | 14 | 21 |   | 1000000000011s |
| 131 | 0 | 16 | 1 | 0 | 0 | 17 | 15 |   | 320 | 00111111111100s |
| 132 | 0 | 17 | 1 | 0 | 0 | 18 | 15 |   | 321 | 00111111111101s |
| 133 | 0 | 18 | 1 | 0 | 1 | 9 | 15 |   | 322 | 01011111111100s |
| 134 | 0 | 8 | 4 | 0 | 1 | 10 | 15 |   | 323 | 01011111111101s |
| 135 | 0 | 5 | 5 | 0 | 2 | 6 | 15 |   | 324 | 01101111111100s |
| 136 | 0 | 4 | 6 | 0 | 2 | 7 | 15 |   | 325 | 01101111111101s |
| 137 | 0 | 5 | 6 | 0 | 3 | 6 | 15 |   | 326 | 01110111111100s |
| 138 | 0 | 3 | 7 | 0 | 6 | 4 | 15 |   | 327 | 01110111111101s |
| 139 | 0 | 3 | 8 | 0 | 9 | 3 | 15 |   | 328 | 01101111111100s |
| 140 | 0 | 2 | 10 | 0 | 13 | 2 | 15 |   | 329 | 01111011111101s |
| 141 | 0 | 2 | 11 | 0 | 14 | 2 | 15 |   | 330 | 01111101111100s |
| 142 | 0 | 1 | 12 | 0 | 15 | 2 | 15 |   | 331 | 01111101111101s |
| 143 | 0 | 1 | 13 | 0 | 16 | 2 | 15 |   | 332 | 01111110111100s |
| 144 | 0 | 0 | 24 | 0 | 34 | 1 | 15 |   | 333 | 01111110111101s |
| 145 | 0 | 0 | 25 | 0 | 35 | 1 | 15 |   | 334 | 01111111011100s |
| 146 | 0 | 0 | 26 | 0 | 36 | 1 | 15 |   | 335 | 01111111011101s |
| 147 | 1 | 0 | 5 | 1 | 0 | 5 | 15 |   | 336 | 01111111101100s |
| 148 | 1 | 1 | 4 | 1 | 1 | 4 | 15 |   | 337 | 01111111110110ts |
| 149 | 1 | 10 | 2 | 1 | 10 | 2 | 15 |   | 338 | 01111111110100s |
| 150 | 1 | 11 | 2 | 1 | 11 | 2 | 15 |   | 339 | 01111111110101s |
| 151 | 1 | 12 | 2 | 1 | 12 | 2 | 15 |   | 340 | 01111111111000s |
| 152 | 1 | 38 | 1 | 1 | 38 | 1 | 15 |   | 341 | 01111111111001s |
| 153 | 1 | 39 | 1 | 1 | 39 | 1 | 15 | 22 |   | 10000000000010s |
| 154 | 1 | 40 | 1 | 1 | 40 | 1 | 15 | 23 |   | 10000000000011s |
| 155 | 0 | 0 | 27 | 0 | 0 | 19 | 16 |   | 352 | 00111111111110 |
| 156 | 0 | 3 | 9 | 0 | 3 | 7 | 16 |   | 353 | 001111111111101s, |
| 157 | 0 | 6 | 5 | 0 | 4 | 5 | 16 |   | 354 | 010111111111100s, |
| 158 | 0 | 7 | 5 | 0 | 7 | 4 | 16 |   | 355 | 010111111111101s |
| 159 | 0 | 9 | 4 | 0 | 17 | 2 | 16 |   | 356 | 011011111111100s |
| 160 | 0 | 12 | 2 | 0 | 37 | 1 | 16 |   | 357 | 011011111111101s |
| 161 | 0 | 19 | 1 | 0 | 38 | 1 | 16 |   | 358 | 011101111111100s |
| 162 | 1 | 1 | 5 | 1 | 1 | 5 | 16 |   | 359 | 011101111111101s |
| 163 | 1 | 2 | 3 | 1 | 2 | 3 | 16 |   | 360 | 011110111111100s |
| 164 | 1 | 13 | 2 | 1 | 13 | 2 | 16 |   | 361 | 011110111111101s |
| 165 | 1 | 41 | 1 | 1 | 41 | 1 | 16 |   | 362 | 011111011111100s |
| 166 | 1 | 42 | 1 | 1 | 42 | 1 | 16 |   | 363 | 011111011111101s |
| 167 | 1 | 43 | 1 | 1 | 43 | 1 | 16 |   | 364 | 011111101111100s |
| 168 | 1 | 44 | 1 | 1 | 44 | 1 | 16 |   | 365 | 011111101111101s |
| 169 |   | ESCAPE |   |   |   |   | 5 |   | 0 | 0000s |

The foregoing table would be stored as two separate tables: one for the 1-starting codewords and having a 5-bit index running from 0 to 23 and one for the 0-starting codewords with a 9-bit index running from 0 to 366.

FIG. 7 illustrates the decoding flow.

Other Preferred Embodiments

Second preferred embodiments modify the foregoing hash indices in the MPEG-4 B-23 table by combining the 0-start and 1-start indices to a single index:

Index=32*(number of bits in VLC part)+2*(the position number of the first repeat of the first bit in the VLC part)+non-sign bit of FLC−68.

This index runs from 0 to 409: the number of bits in the VLC part ranges from 2 to 14 (so the first number can be expressed with four bits), the position of the first repeat is also in the range from 2 to 14 (another four bits), and the last number is one bit. Thus a concatenated 9-bit index suffices. Note that the number of bits in the VLC part equals the position of the first repeat for the codewords starting with a 1; but this is not possible for the codewords starting with a 0. Also, the number of bits and the position number both have a minimum of 2, so the −68 normalizes the index to have a minimum of 0.

Third preferred embodiments fold the 0-starting codeword table (subtable of foregoing MPEG-4 table) over onto itself to fill in the unused spaces. That is, the Index has an unused gap between 1 and 32, so the 14 Index values 352–365 can be mapped into this gap; similarly the unused gap between 35 and 64 can be filled with the 22 Index values 320–341, the unused gap between 69 and 96 can be filled with the 20 Index values 288–307, and so forth up to the gap between 171 and 192 filled with the 14 Index values 192–205. This requires a little more computation:

Index=32*(number of 1's in VLC part)+2*(number of 1's before interior 0 of VLC part)+non-sign bit of FLC.

if (Index>=192) Index=383−Index.

Thus Index values 352–365 map to 18–31, 320–341 map to 42–63, 288–307 map to 76–95, and so forth up to 192–205 map to 178–191. That is, the folded 0-starting codeword table has 146 entries, but the index for the folded table runs from 0 to 191 and thus requires a 192-word memory block for each of the intra and inter tables.

Fourth Fourth preferred embodiments further reduce the gaps in the folded 0-starting codeword table, using the index:

Index=26*(number of 1's in VLC part)+2*(number of 1's before interior 0 of VLC part)+non-sign bit of FLC.

If (Index>=156) Index=311−Index.

The intermediate Index (before folding) can no longer be formed as the concatenation of three fields, because 26 is not a power of 2, so a little more computation is required. The Index values 286–299 map to 12–25, 260–281 map to 30–51, 234–253 map to 58–77, and so forth up to 156–160 map to 142–155. That is, the compact folded 0-starting codeword table has 146 entries, but the index for the compact folded table runs from 0 to 155 and thus requires a 156-word memory block for each of the intra and inter tables.

Fifth preferred embodiments further reduce the gaps in the nonfolded 0-starting codeword table, using the index:

Index=22*(number of 1's in VLC part)+2*(number of 1's before interior 0 of VLC part)+non-sign bit of FLC.

This Index can not be formed as the concatenation of 3 fields, because 22 is not a power of 2, so a little more computation is required, (but not as much as the compact folded approach). The index running from 0 to 255 implies a 256-word block of memory can contain each of the inter and intra tables.

In summary, the preferred embodiment indexings and table(s) for MPEG-4 B-23 (RVLC for DCT coefficients) reduce the code size significantly, as well as the number of cycles required for execution compared to using a gigantic case statement or nested if-statements, particularly in the worst case. The C code reduces from roughly 900 lines to about 150 lines, at the expense of increasing table storage from 2*170=340 words (inter and intra tables) to 2*24+ 2*366=780 words. If the 0-start table is folded over, only 2*24+2*192=432 words are required. If the 0-start table is compacted (without folding), only 2*24+2*256=560 words are required. If the 0-start table is folded over and compacted, only 2*24+2*156=360 words are required.

H.263 Preferred Embodiments

Figure 9:
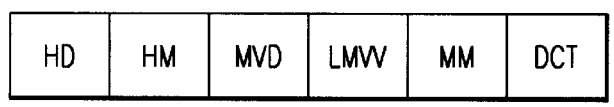
FIG. 9 shows a header structure.
Figure 8B:
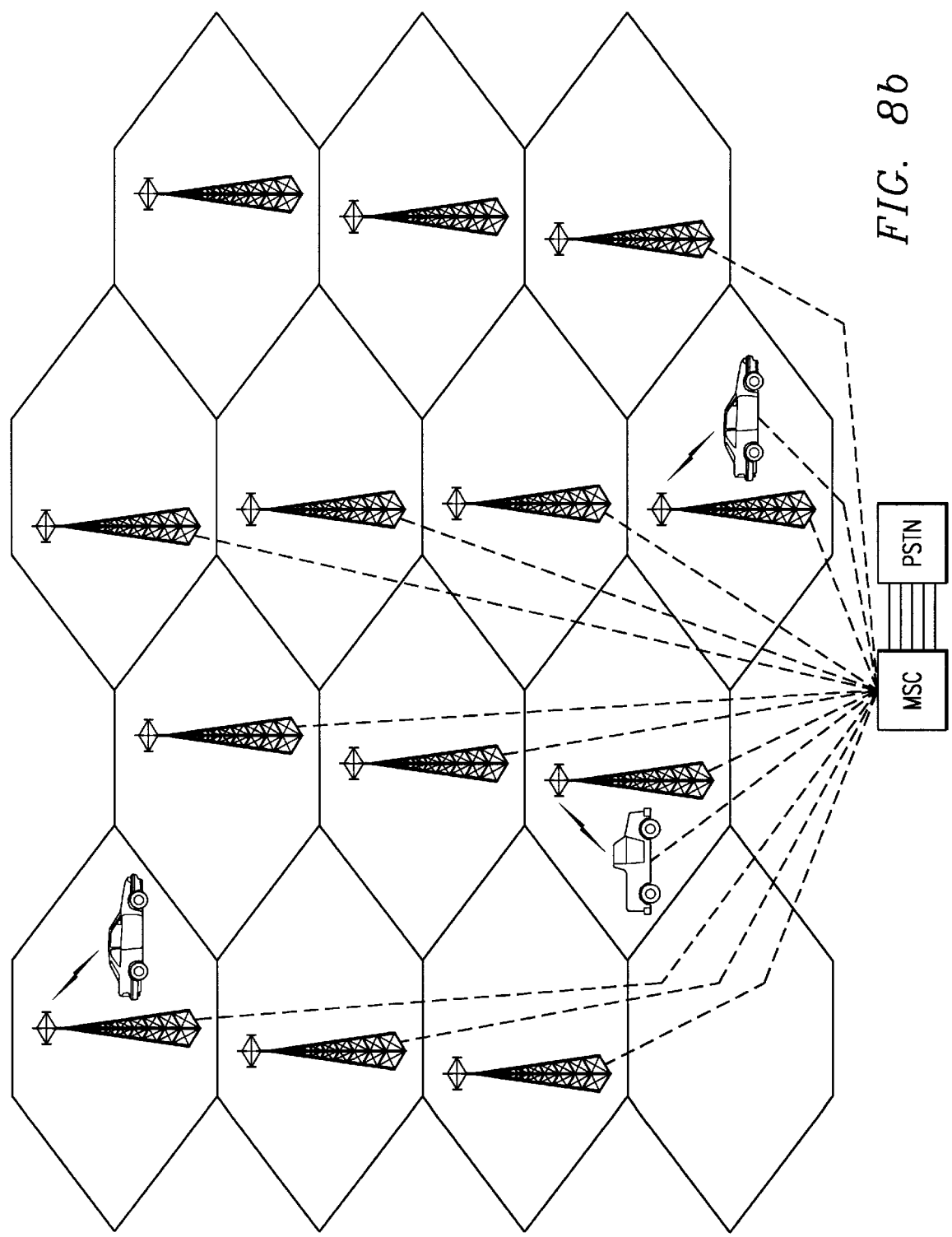

The H.263++ standard has an optional data partitioning mode in which the MBs in a video picture segment (packet) are rearranged analogously to MPEG-4 so that header information for all MBs in the segment is followed by MVs for all MBs in the segment and then followed by DCT coefficients for all MBs. The header, MV, and DCT partitions are separated by markers, allowing for resynchronization when the end of the partition in which an error occurred is reached; see FIG. 9 illustrating the HD (header data), HM (header marker), MVD (motion vector data), LMVV (last MV value), MM (MV marker), and DCT (DCT data) fields.

The HD field includes reversible variable length code (RVLC) coded data for combined COD and MCBPC for all MBs in a packet. The standard has five tables which apply to the cases of INTRA MBs, INTER MBs, B MBs, EP MBs, and EI MBs, respectively. The INTER MBs table (see below) is the largest of the five and has 26 codewords; the other four tables are subsets. The codewords of the INTER MBs table have the symmetrical form 0 . . . 01 . . . 10 . . . 0 for coded MBs, and for a non-coded MB the codeword is simply 1. Thus both the first and last bits of the codeword can be interpreted as the COD field. The codewords vary from one to eleven bits, with 1 the smallest and 01111111110 the largest. Thus indexing by the codeword itself would spread the codewords out in a block of 1023 memory addresses. Partitioning into classes according to the number of initial 0s does not help much because the codewords starting with a single 0 run from 010 to 01111111110, a span of 1022.

The preferred embodiment Index for the INTER MBs table again is a hash type function of the codeword:

(1) For the codeword starting with 1, take the Index equal to 0.

(2) For codewords starting with 0, form an index as:

Index=10*(number of initial 0's minus 1)+(number of 1's).

Thus this index runs from 0 to 41. The index running from 0 to 41 implies a 42-word block of memory can contain the table. Indeed, the 26 Index values are 0–9, 11–17, 21–25, 31–33, and 41.

| MB type | CBPC | Codeword COD + MCBPC | Index | Number of bits |
|---|---|---|---|---|
|  |  | 1 | 0 | 1 |
| 0 (INTER) | 00 | 010 | 1 | 3 |
| 0 | 10 | 00100 | 11 | 5 |
| 0 | 01 | 011110 | 4 | 6 |
| 0 | 11 | 0011100 | 13 | 7 |
| 1 (INTER + Q) | 00 | 01110 | 3 | 5 |
| 1 | 10 | 00011000 | 22 | 8 |
| 1 | 01 | 011111110 | 7 | 9 |
| 1 | 11 | 01111111110 | 9 | 11 |
| 2 (INTER4V) | 00 | 0110 | 2 | 4 |
| 2 | 10 | 01111110 | 6 | 8 |
| 2 | 01 | 00111100 | 14 | 8 |
| 2 | 11 | 000010000 | 31 | 9 |
| 3 (INTRA) | 00 | 001100 | 12 | 6 |
| 3 | 11 | 0001000 | 21 | 7 |
| 3 | 10 | 001111000 | 15 | 9 |
| 3 | 01 | 000111000 | 23 | 9 |
| 4 (INTRA + Q) | 00 | 0111110 | 5 | 7 |
| 4 | 11 | 0011111100 | 16 | 10 |
| 4 | 10 | 0001111000 | 24 | 10 |
| 4 | 01 | 0000110000 | 32 | 10 |
| 5 (INTER4V + Q) | 00 | 00111111100 | 17 | 11 |
| 5 | 01 | 00011111000 | 25 | 11 |
| 5 | 10 | 00001110000 | 33 | 11 |
| 5 | 11 | 00000100000 | 41 | 11 |
| Stuffing |  | 0111111110 | 8 | 10 |

Another preferred embodiment folds the codeword table over onto itself to fill in the unused spaces. That is, the Index has an unused gap between 9 and 11, so the Index values 41 can be mapped into this gap; and the unused gap between 17 and 21 can be filled with the Index values 31–33. This requires a little more computation:

if (initial bit is 1) Index=0 else Index=10*(number of initial 0's minus 1)+(number of 1's).

if (Index>=25) Index=51−Index.

That is, the folded codeword table has 26 entries, but the index for the folded table runs from 0 to 25 and thus just fills the 26 word memory block with addresses corresponding to Index.

More generally, the various RVLC tables of H.263++ all have symmetric codewords of the type 0 . . . 01 . . . 10 . . . 0 plus the codeword 1, and indexes of the form:

if (initial bit is 1) Index=0 else Index=N*(number of initial 0's minus 1)+(number of 1's).

can be used for any N such that N>=(maximum number of 1's). Thus for INTRA MBs use N>=5, for INTER MBs use N>=9, for B MBs use N>=7, for EP MBs use N>=6, and for EI MBs use N>=8. Of course, a larger N implies a larger stretch of memory but also more opportunity for folding.

For example, the foregoing table (the table for INTER MBs) lists the Index with N=10 where the maximum Index= 41 for codeword 00000100000; with the Index based on N=9 this codeword would have the maximum Index=37. But the N=10 Index can fold the Index=41 codeword into the gap between Index=9 (codeword 011 1 1 1 111 10) and Index=11 (codeword 00100) by using Index=51-Index if Index>=25. If instead the Index had been based on N=9, then this gap closes because codeword 01111111110 would still have Index=9, but codeword 00100 would now have Index=10. Thus the maximum folding would be to the first gap at Index=17 and would use Index=54-Index when Index>=28. With this folding the maximum Index then decreases from 37 to 26 (for codeword 000010000), which implies a memory block of 27 words and all addresses correspond to Index values except for Index=18.

What is claimed is:

1. A method of decoding reversible variable-length codewords, comprising:

(a) providing a table of entries, each of said entries including an information portion and a corresponding codeword, said entries indexed by a hash function of the codewords; and (b) upon receipt of a first codeword, applying said hash function to said codeword to yield a first index; and (c) using said first index to access said table and recover the information portion of the entry including said first codeword.

2. The method of claim 1, wherein:

(a) said table is an MPEG-4 table.

3. The method of claim 1, wherein:

(a) said table is an H.263++ table.

* * * * *